(12) United States Patent
Park et al.

(10) Patent No.: US 9,201,265 B2
(45) Date of Patent: Dec. 1, 2015

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Yong Jun Park, Yongin-si (KR); Young Suk Lee, Hwaseong-si (KR); Jong Soo Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 16 days.

(21) Appl. No.: 14/282,310

(22) Filed: May 20, 2014

(65) Prior Publication Data

US 2015/0168777 A1 Jun. 18, 2015

(30) Foreign Application Priority Data

Dec. 18, 2013 (KR) .......................... 10-2013-0158196

(51) Int. Cl.
*G02F 1/1335* (2006.01)
*G02F 1/1343* (2006.01)

(52) U.S. Cl.
CPC .... *G02F 1/133528* (2013.01); *G02F 1/133536* (2013.01); *G02F 1/134309* (2013.01); *G02F 2001/133548* (2013.01)

(58) Field of Classification Search
CPC ...................... G02F 1/133528; G02F 1/133536
See application file for complete search history.

(56) References Cited

U.S. PATENT DOCUMENTS

2015/0042928 A1* 2/2015 Won et al. ....................... 349/96

FOREIGN PATENT DOCUMENTS

| KR | 1020080037324 A | 4/2008 |
|---|---|---|
| KR | 1020100050627 A | 5/2010 |
| KR | 1020120040868 A | 4/2012 |
| KR | 1020150007175 | 1/2015 |
| KR | 1020150019323 | 2/2015 |

* cited by examiner

*Primary Examiner* — Phu Vu
(74) *Attorney, Agent, or Firm* — Innovation Counsel LLP

(57) ABSTRACT

An exemplary embodiment provides a liquid crystal display including: a substrate; a first wire grid polarizer; a thin film transistor; a pixel electrode; a roof layer; and a plurality of microcavities. The substrate has a bottom surface and a top surface. The first wire grid polarizer is disposed on the bottom surface of the substrate. The thin film transistor is disposed on the top surface of the substrate. The pixel electrode is connected to the thin film transistor. The roof layer is disposed to face the pixel electrode. The plurality of microcavities having injection holes are formed between the pixel electrode and the roof layer, the microcavities forming a liquid crystal layer containing liquid crystal molecules.

19 Claims, 20 Drawing Sheets

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2013-01581% filed in the Korean Intellectual Property Office on Dec. 18, 2013, the entire contents of which are incorporated herein by reference.

BACKGROUND (a) Field

The present application relates to a liquid crystal display and a manufacturing method thereof.

(b) Description of the Related Art

A liquid crystal display as one of flat panel display devices that are being widely used includes two display panels, wherein field generating electrodes such as a pixel electrode and a common electrode are formed with a liquid crystal layer interposed therebetween.

The liquid crystal display generates an electric field in a liquid crystal layer by applying a voltage to the field generating electrodes to determine orientations of liquid crystal molecules of the liquid crystal layer and control polarization of incident light, thereby displaying an image.

A technique of forming a cavity in a pixel and filling the cavity with liquid crystals to implement a display has been developed for one of the liquid crystal displays. Although two sheets of substrates are used in a conventional liquid crystal display, this technique forms constituent elements on one substrate, thereby reducing weight, thickness, and the like of the device.

When such a display technique is embodied, an injection hole may be capped by using a coating material or the like after a liquid crystal is injected, and a polarizer may be attached to a top surface and a bottom surface of a panel. However, as the panel is bent due to a stress generated in a substrate to which a polarizer is attached or between capping layers, a crack or the like is generated.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display and a manufacturing method thereof, in which no crack is generated in a substrate even when a display panel is bent.

An exemplary embodiment provides a liquid crystal display including: a substrate; a first wire grid polarizer; a thin film transistor; a pixel electrode; a roof layer; and a plurality of microcavities. The substrate has a bottom surface and a top surface. The first wire grid polarizer is provided on the bottom surface of the substrate. The thin film transistor is provided on the top surface of the substrate. The pixel electrode is connected to the thin film transistor. The roof layer is provided to face the pixel electrode. The plurality of microcavities having injection holes are formed between the pixel electrode and the roof layer, the microcavities forming a liquid crystal layer containing liquid crystal molecules.

The liquid crystal display may further include a capping layer provided on the roof layer, and the capping layer may cover the injection holes.

The liquid crystal display may further include a second wire grid polarizer provided on the capping layer.

The liquid crystal display may further include a passivation layer covering the second wire grid polarizer.

The passivation layer may fill a groove of the second wire grid polarizer.

The liquid crystal display may further include a common electrode and a lower insulating layer provided between the microcavities and the roof layer, and the lower insulating layer may be provided on the common electrode.

An injection hole formation region may be formed between the microcavities, and the capping layer may cover the injection hole formation region.

The thin film transistor may be connected to a data line, and a partition wall formation portion may be formed between the microcavities along an extension direction of the data line.

The liquid crystal display may further include a backlight unit configured to emit light provided at a lower end of the first wire grid polarizer, and the light emitted from the backlight device may pass toward the top surface of the substrate through the first wire grid polarizer.

The substrate may be a flexible substrate.

Another exemplary embodiment provides a manufacturing method of a liquid crystal display as follows. A thin film transistor is formed on a top surface of a substrate. A pixel electrode is formed to be connected to the thin film transistor. A sacrificial layer is formed on the pixel electrode. A roof layer is formed on the sacrificial layer. A plurality of microcavities having injection holes are formed by removing the sacrificial layer. A liquid crystal material is injected into the microcavities. A first wire grid polarizer is formed on a bottom surface of the substrate.

The manufacturing method may further include forming a capping layer on the roof layer, and the capping layer may be formed to cover the injection holes.

The manufacturing method may further include forming a second wire grid polarizer on a top surface of the capping layer.

The manufacturing method may further include forming a passivation layer on the capping layer to cover the second wire grid polarizer.

The manufacturing method may further include forming a common electrode and a lower insulating layer on the sacrificial layer, before the forming of the roof layer.

The manufacturing method may further include forming an injection hole formation region between the microcavities, and the capping layer may be formed to cover the injection hole formation region.

The injection hole formation region may be formed to extend along a direction parallel with a gate line connected to the thin film transistor.

The thin film transistor may be connected to a data line, and a partition wall formation portion may be formed between the microcavities along an extension direction of the data line.

The substrate may be formed as a flexible substrate.

In accordance with the exemplary embodiments, no crack is generated by using a wire grid polarizer (WGP) instead of a conventional polarizer even when a display panel is bent. Further, by forming a wire grid polarizer at a lower end of a substrate, it is possible to reuse light of a reflected polarization component in order to improve light efficiency.

DETAILED DESCRIPTION OF THE EMBODIMENTS

Figure 1:
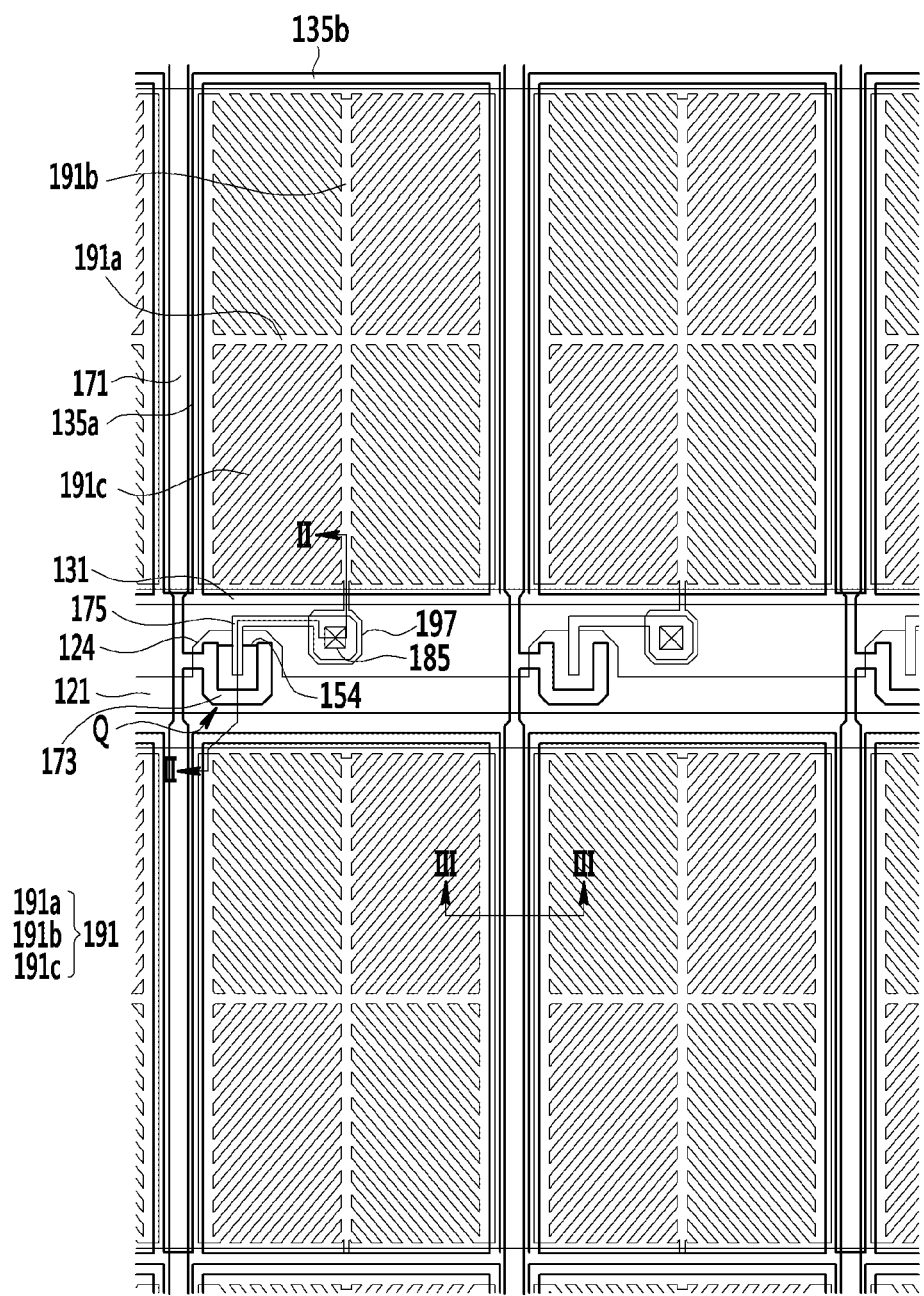
FIG. 1 is a top plan view showing a liquid crystal display in accordance with an exemplary embodiment.

Hereinafter, exemplary embodiments will be described in detail with reference to the accompanying drawings. As those skilled in the art would realize, the described embodiments may be modified in various different ways, all without departing from the spirit or scope of the embodiments. On the contrary, exemplary embodiments introduced herein are provided to make disclosed contents thorough and complete, and sufficiently transfer the spirit of the inventive concept to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening elements may also be present. Like reference numerals designate like elements throughout the specification.

Figure 2:
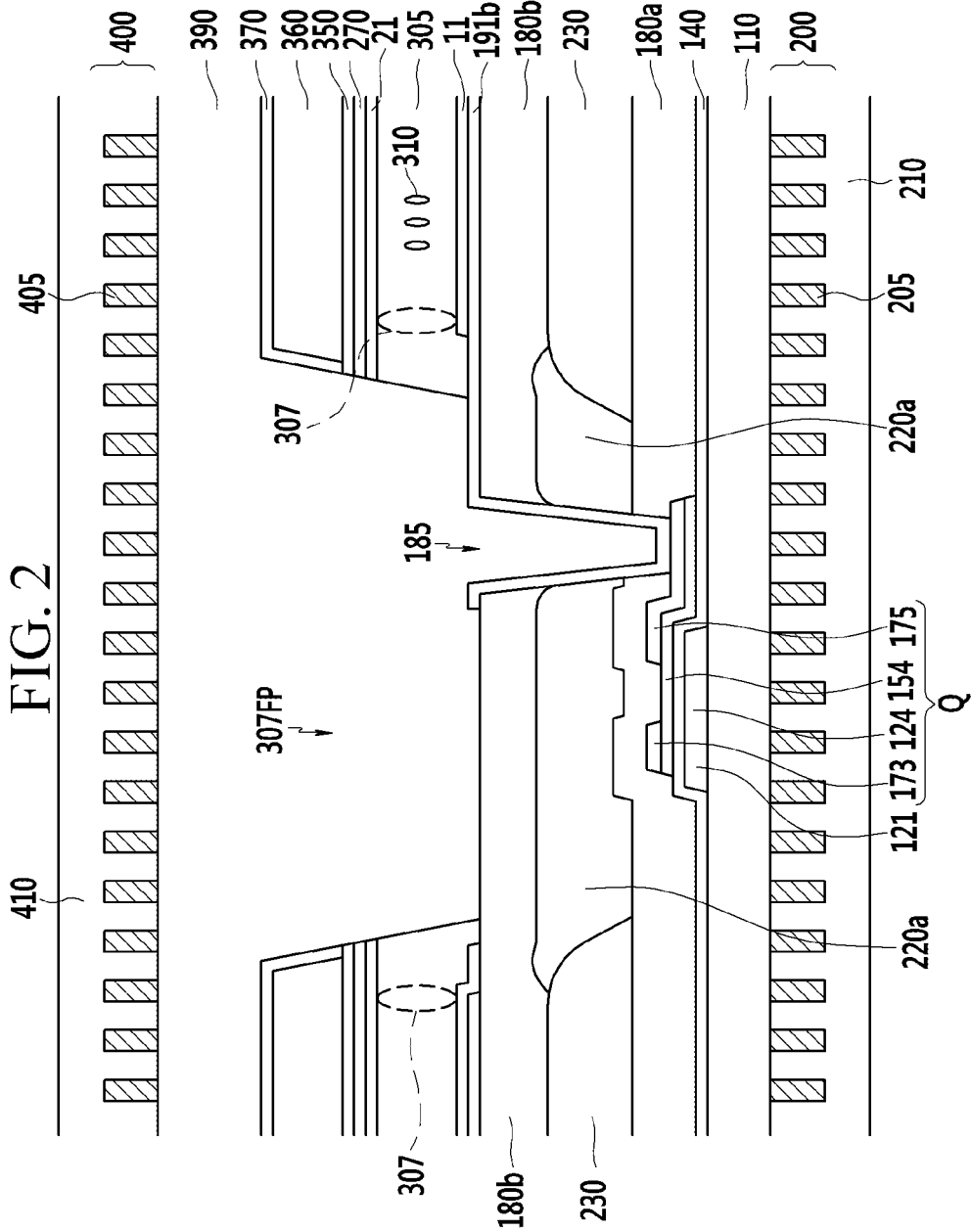
FIG. 2 is a cross-sectional view taken along a line II-II of FIG. 1.
Figure 3:
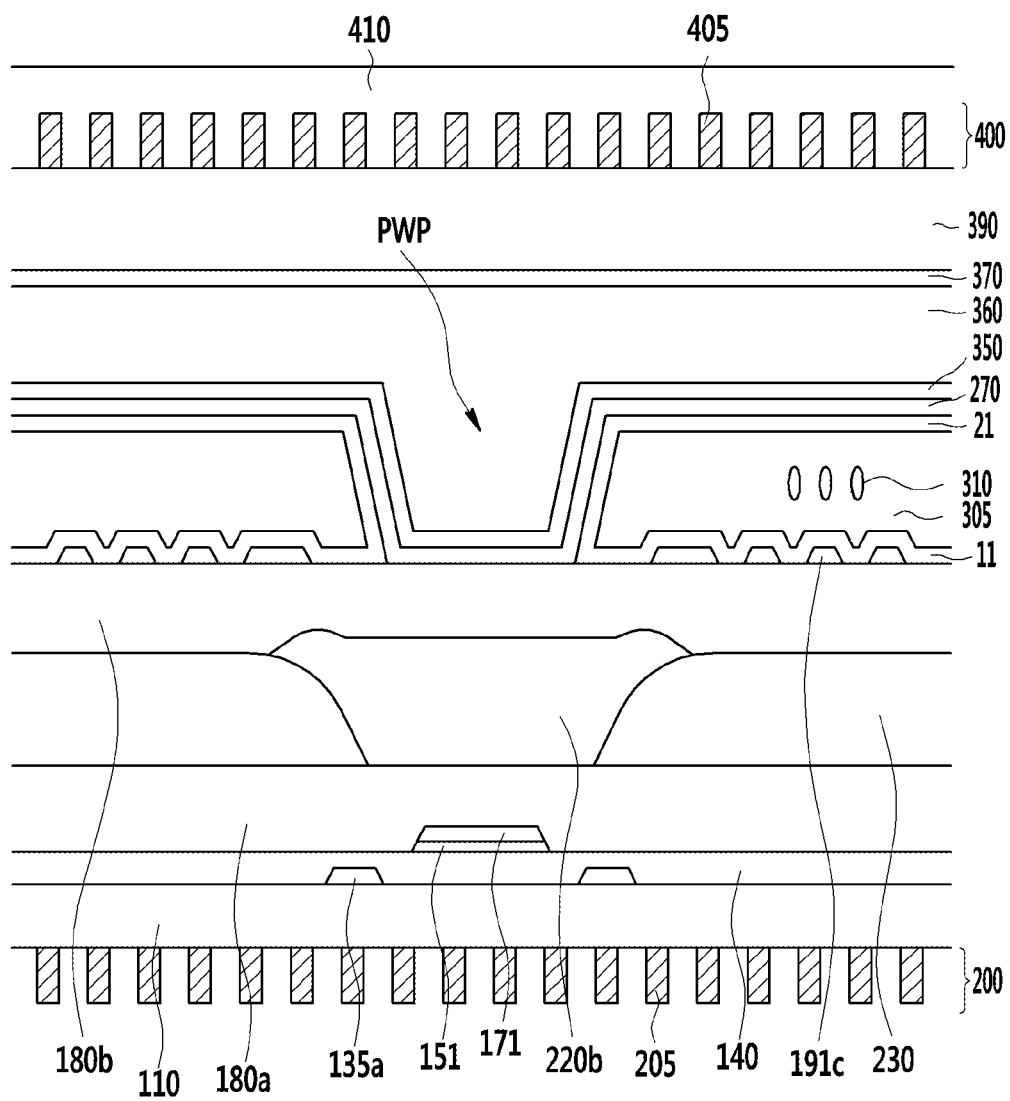
FIG. 3 is a cross-sectional view taken along a line III-III of FIG. 1.

FIG. 1 is a top plan view showing a liquid crystal display in accordance with an exemplary embodiment. FIG. 2 is a cross-sectional view taken along a line II-II of FIG. 1. FIG. 3 is a cross-sectional view taken along a line III-III of FIG. 1.

Referring to FIGS. 1 to 3, a gate line 121 and a storage electrode line 131 are formed on a substrate 110 formed of transparent glass or plastic. In the liquid crystal display of the present exemplary embodiment, the substrate 110 may be flexible.

The gate line 121 includes a gate electrode 124. The storage electrode line 131 is mainly extended in a horizontal direction, and transfers a predetermined voltage such as a common voltage Vcom. The storage electrode line 131 includes a pair of vertical storage electrode portions 135a substantially extended to be perpendicular to the gate line 121, and a horizontal storage electrode portion 135b connecting ends of the pair of vertical storage electrode portions 135a to each other. The storage electrode portions 135a and 135b have a structure surrounding a pixel electrode 191.

In the present exemplary embodiment, a first wire grid polarizer 200 is provided on a bottom surface of the substrate 110. The first wire grid polarizer 200 includes a first wire grid polarization pattern 205. A passivation layer 210 is provided on the first wire grid polarizer 200. The passivation layer 210 may be located on the bottom surface of the substrate 110 while filling grooves of the first wire grid polarization pattern 205. The passivation layer 210 serves to protect the first wire grid polarization pattern 205 against the external environment. In the present exemplary embodiment, the first wire grid polarizer 200 having a structure in which the first wire grid polarization pattern 205 is formed with the grooves instead of a conventional film-like polarizer is provided on the bottom surface of the substrate 110, and thus less stress with respect to the substrate 110 is generated. Accordingly, no crack is generated even when the substrate 110 is bent.

A gate insulating layer 140 is formed on the gate line 121 and the storage electrode line 131. A semiconductor layer 151 provided at a lower portion of a data line 171, and a semiconductor layer 154 positioned at a lower portion of a source/drain electrode and at a channel portion of a thin film transistor Q, are formed on the gate insulating layer 140.

A plurality of ohmic contacts may be formed on each of the semiconductor layers 151 and 154, and between the data line 171 and the source/drain electrode, but this is omitted in the drawings.

Data conductors 171, 173, and 175 including a source electrode 173, the data line 171 connected with the source electrode 173, and a drain electrode 175 are formed on each of the semiconductor layers 151 and 154 and the gate insulating layer 140.

The gate electrode 124, the source electrode 173, and the drain electrode 175 form the thin film transistor Q together with the semiconductor layer 154, and a channel of the thin film transistor Q is formed on the portion of the semiconductor layer 154 between the source electrode 173 and the drain electrode 175.

A first interlayer insulating layer 180a is formed on the data conductors 171, 173, and 175 and an exposed portion of the semiconductor layer 154. The first interlayer insulating layer 180a may include an inorganic insulating material such as a silicon nitride ($SiN_x$) and a silicon oxide ($SiO_x$), or an organic insulating material.

A color filter 230 and a light blocking member 220 are formed on the first interlayer insulating layer 180a.

The light blocking member 220 has a lattice structure having an opening corresponding to a region displaying an image, and is formed of a material preventing light from being transmitted therethrough. The color filter 230 is formed at an opening of the light blocking member 220. The light blocking member 220 includes a horizontal light blocking member 220a formed in a direction parallel to the gate line 121, and a vertical light blocking member 220b formed in a direction parallel to the data line 171.

The color filter 230 may display one of primary colors, such as three primary colors including red, green, and blue. However, the colors are not limited to the three primary colors including red, green, and blue, and the color filter 230 may also display one among a cyan-based color, a magenta-based color, a yellow-based color, and a white-based color. The color filter 230 may be formed of materials displaying different colors for each adjacent pixel.

A second interlayer insulating layer 180b covering the color filter 230 and the light blocking member 220 is formed on the color filter 230 and the light blocking member 220. The second interlayer insulating layer 180b may include the inorganic insulating material, such as a silicon nitride ($SiN_x$) and a silicon oxide ($SiO_x$), or the organic insulating material. Unlike the cross-sectional view of FIG. 2, in a case where a step is generated due to a difference in thickness between the color filter 230 and the light blocking member 220, the second interlayer insulating layer 180b includes an organic insulating material, so that it is possible to decrease or remove the step.

The interlayer insulating layers 180a and 180b have a contact hole 185 extending to and exposing the drain electrode 175.

The pixel electrode 191 is provided on the second interlayer insulating layer 180b. The pixel electrode 191 may be formed of a transparent conductive material such as ITO or IZO.

An overall shape of the pixel electrode 191 is a quadrangle, and the pixel electrode 191 includes cross stems configured by a horizontal stem 191a and a vertical stem 191b crossing the horizontal stem 191a. Further, the pixel electrode 191 is divided into four sub-regions by the horizontal stem 191a and the vertical stem 191b, and each sub-region includes a plurality of minute branches 191c. In the present exemplary embodiment, the pixel electrode 191 may further include an outer stem surrounding an outer circumference of the pixel electrode 191.

The minute branches 191c of the pixel electrode 191 form an angle of approximately 40° to 45° with the gate line 121 or the horizontal stem 191a. Further, the minute branches of two adjacent sub-regions may be perpendicular to each other. Furthermore, a width of each minute branch may be gradually increased, or a distance between the minute branches 191c may be varied.

The pixel electrode 191 includes an extension 197 which is connected at a lower end of the vertical stem 191b and has a larger area than the vertical stem 191b, and is physically and electrically connected with the drain electrode 175 through the contact hole 185 at the extension 197 to receive a data voltage from the drain electrode 175.

The thin film transistor Q and the pixel electrode 191 described above are just described as examples, and a structure of the thin film transistor and a design of the pixel electrode may be modified in order to improve side visibility.

A lower alignment layer 11 is formed on the pixel electrode 191, and may be a vertical alignment layer. The lower alignment layer 11, as a liquid crystal alignment layer made of a material such as polyamic acid, polysiloxane, polyimide, or the like, may include at least one of generally used materials.

An upper alignment layer 21 is provided at a portion facing the lower alignment layer 11, and a microcavity 305 is formed between the lower alignment layer 11 and the upper alignment layer 21. A liquid crystal material including liquid crystal molecules 310 is injected into the microcavity 305 through an injection hole 307. The microcavity 305 may be formed in a column direction, that is, a vertical direction, of the pixel electrode 191. In the present exemplary embodiment, the alignment material forming the alignment layers 11 and 21 and the liquid crystal material including the liquid crystal molecules 310 may be injected into the microcavity 305 by using capillary force.

The microcavity 305 is divided in a vertical direction by a plurality of injection hole forming regions 307FP positioned at a portion overlapping the gate line 121, and a plurality of microcavities 305 may be formed along the direction in which the gate line 121 is extended. Each of the plurality of formed microcavities 305 may correspond to a pixel area, and the pixel areas may correspond to a region displaying an image.

In the present exemplary embodiment, since the liquid crystal material is injected through the injection hole 307 of the microcavity 305, it is possible to form the liquid crystal display without forming a separate upper substrate.

A common electrode 270 and a lower insulating layer 350 are positioned on the upper alignment layer 21. The common electrode 270 receives the common voltage, and generates an electric field together with the pixel electrode 191 to which the data voltage is applied to determine a direction in which the liquid crystal molecules 310 positioned at the microcavity 305 between the two electrodes are inclined. The common electrode 270 forms a capacitor with the pixel electrode 191 to maintain the received voltage even after the thin film transistor is turned off. The lower insulating layer 350 may be formed of a silicon nitride ($SiN_x$) or a silicon oxide ($SiO_x$).

In the present exemplary embodiment, it is described that the common electrode 270 is formed on the microcavity 305, but in another exemplary embodiment, the common electrode 270 is formed under the microcavity 305, so that liquid crystal driving according to a coplanar electrode (CE) mode is possible.

A roof layer 360 is positioned on the lower insulating layer 350. The roof layer 360 serves as a support so that the microcavity 305, which is a space between the pixel electrode 191 and the common electrode 270, is formed. The roof layer 360 may include silicon oxycarbide (SiOC), a photoresist, or other organic materials.

An upper insulating layer 370 is provided on the roof layer 360. The upper insulating layer 370 may come into contact with an upper surface of the roof layer 360. The upper insulating layer 370 may be formed of a silicon nitride ($SiN_x$) or a silicon oxide ($SiO_x$).

In the exemplary embodiment, a capping layer 390 fills the liquid crystal injection hole formation region 307FP and covers the liquid crystal injection hole 307 of the microcavity 305 exposed by the liquid crystal injection hole formation region 307FP. The capping layer 390 includes an organic material or an inorganic material.

In the present exemplary embodiment, since a partition wall structure such as the partition wall formation portion PWP exists between the microcavities 305, even if the insulation substrate 110 is bent, generated stress is small, and a change degree of a cell gap may be considerably reduced.

In the present exemplary embodiment, a second wire grid polarizer 400 including a second wire grid polarization pattern 405 is provided on a top surface of the capping layer 390.

A passivation layer 410 is provided on the second wire grid polarizer 400. The passivation layer 410 may be located on the capping layer 390 while filling grooves of the second wire grid polarization pattern 405. The passivation layer 410 serves to protect the second wire grid polarization pattern 405 against the external environment.

In the present exemplary embodiment, as shown in FIG. 3, a partition wall formation portion PWP is positioned between the microcavities 305 adjacent to each other in a horizontal direction. The partition wall formation portion PWP may be formed in an extending direction of the data line 171, and may be covered by the roof layer 360. The lower insulating layer 350, the common electrode 270, the upper insulating layer 370, and the roof layer 360 are filled in the partition wall formation portion PWP, and the structure forms the partition wall to partition or define the microcavity 305. In the present exemplary embodiment, since a partition wall structure such as the partition wall formation portion PWP exists between the microcavities 305, even if the insulation substrate 110 is bent, generated stress is small, and a change degree of a cell gap may be considerably reduced.

Hereinafter, a manufacturing method of the aforementioned liquid crystal display will be described with reference to FIG. 4 to FIG. 18D in accordance with another exemplary embodiment. The following exemplary embodiment may be modified into other methods as an exemplary embodiment of the manufacturing method.

FIG. 4 to FIG. 17 are stepwise cross-sectional views showing the manufacturing method of the liquid crystal display in accordance with the present exemplary embodiment. FIGS. 4, 6, 8, 10, 11, 13, 15, 16, and 17 sequentially show the cross-sectional views taken along the line II-II of FIG. 1. FIGS. 5, 7, 9, 12, and 14 sequentially show the cross-sectional views taken along the line III-III of FIG. 1.

Figure 4:
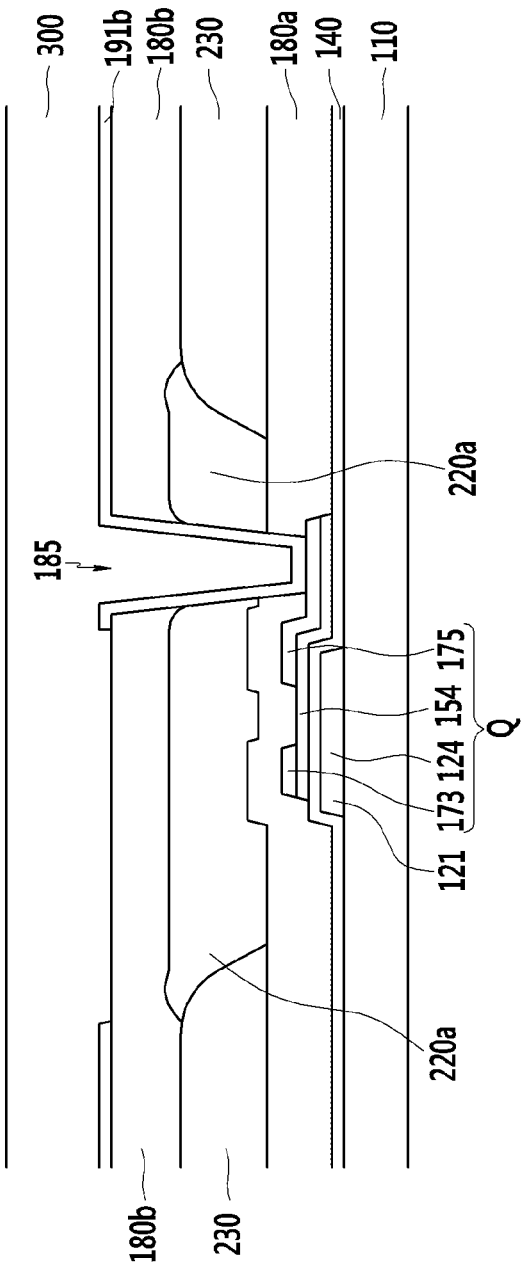
FIG. 4, 5, 6, 7, 8, 9, 10, 11, 12, 13, 14, 15, 16, 17, 18A, 18B, 18C, 18D are stepwise cross-sectional views showing a manufacturing method of a liquid crystal display in accordance with the exemplary embodiment.
Figure 5:
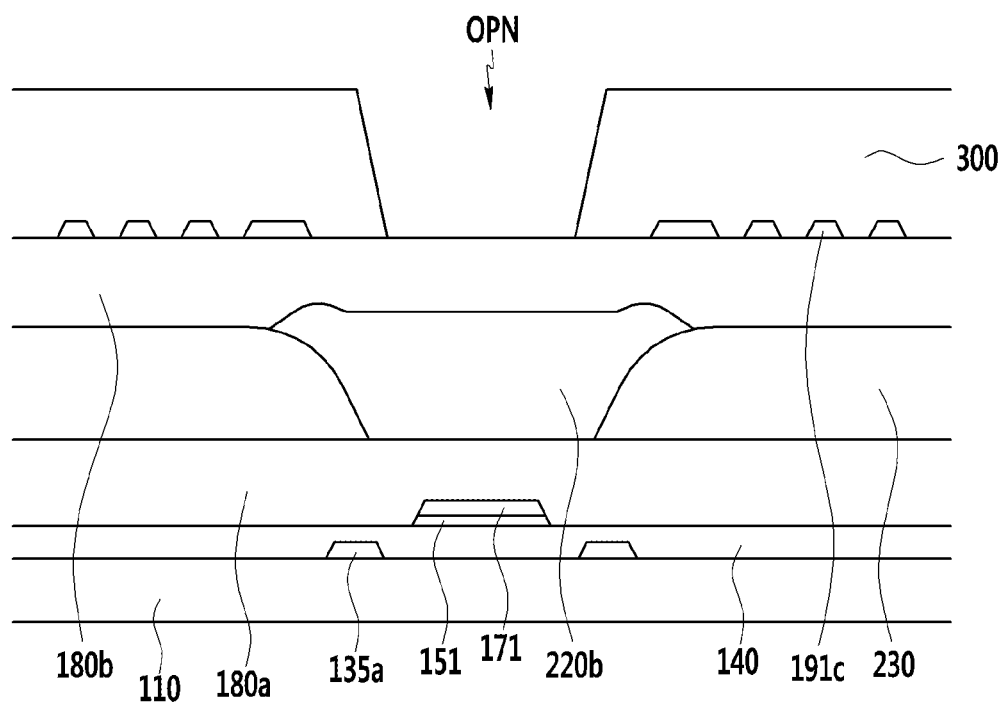

Referring to FIG. 1, FIG. 4, and FIG. 5, in order to form a generally known switching element on a substrate 110, the gate line 121 extended in the horizontal direction is formed, and the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to be extended in the vertical direction while crossing the gate line 121.

The first interlayer insulating layer 180a is formed on the data conductors 171, 173, and 175 including the source electrode 173, the drain electrode 175, and the data line 171, and the exposed portion of the semiconductor layer 154.

The color filter 230 is formed at a position corresponding to the pixel area on the first interlayer insulating layer 180a, and the light blocking members 220a and 220b are formed between the color filters 230.

The second interlayer insulating layer 180b covering the color filter 230 and the light blocking member 220 is formed on the color filter 230 and the light blocking member 220, and the second interlayer insulating layer 180b is formed to have the contact hole 185 electrically and physically connecting the pixel electrode 191 and the drain electrode 175.

Next, the pixel electrode 191 is formed on the second interlayer insulating layer 180b, and a sacrificial layer 300 is formed on the pixel electrode 191. As shown in FIG. 5, an opening OPN is formed on the sacrificial layer 300 along a direction in parallel with the data line 171. In a subsequent process, the common electrode 270, the lower insulating layer 350, the roof layer 360, and the upper insulating layer 370 are filled in the open portion OPN to form the partition wall formation portion PWP.

Figure 6:
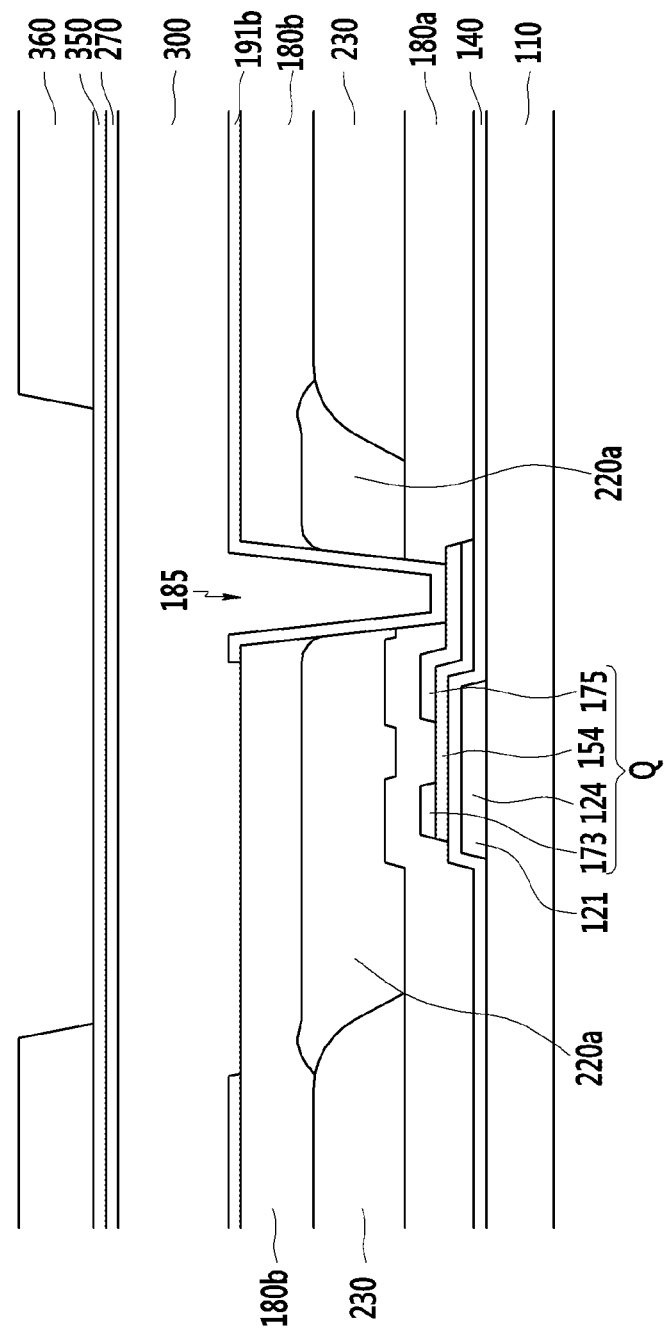
Figure 7:
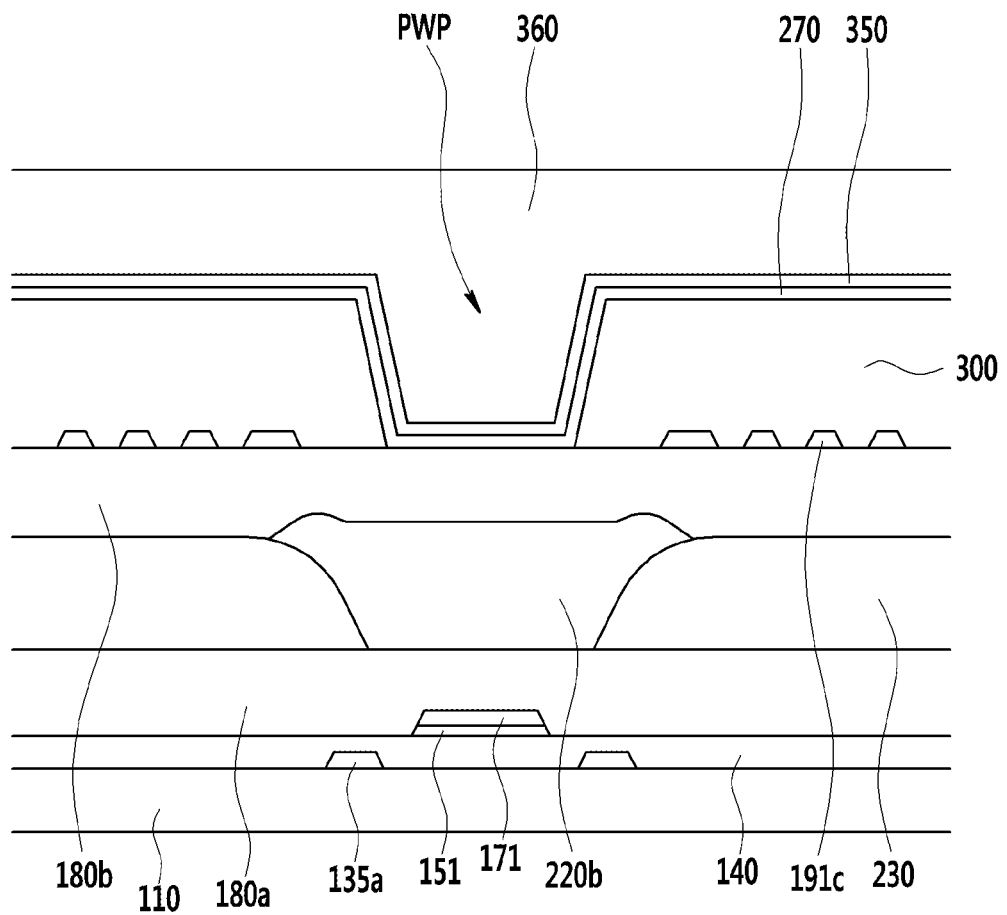

Referring to FIG. 6 and FIG. 7, the common electrode 270, the lower insulating layer 350, and the roof layer 360 are sequentially formed on the sacrificial layer 300. The roof layer 360 may be removed at the region corresponding to the light blocking member 220a positioned between the pixel areas adjacent in the vertical direction by an exposure and development process. The roof layer 360 exposes the lower insulating layer 350 in the region corresponding to the light blocking member 220a. In this case, the common electrode 270, the lower insulating layer 350, and the roof layer 360 fill the open portion OPN of the sacrificial layer 300 thereby forming the partition wall formation portion PWP.

Figure 8:
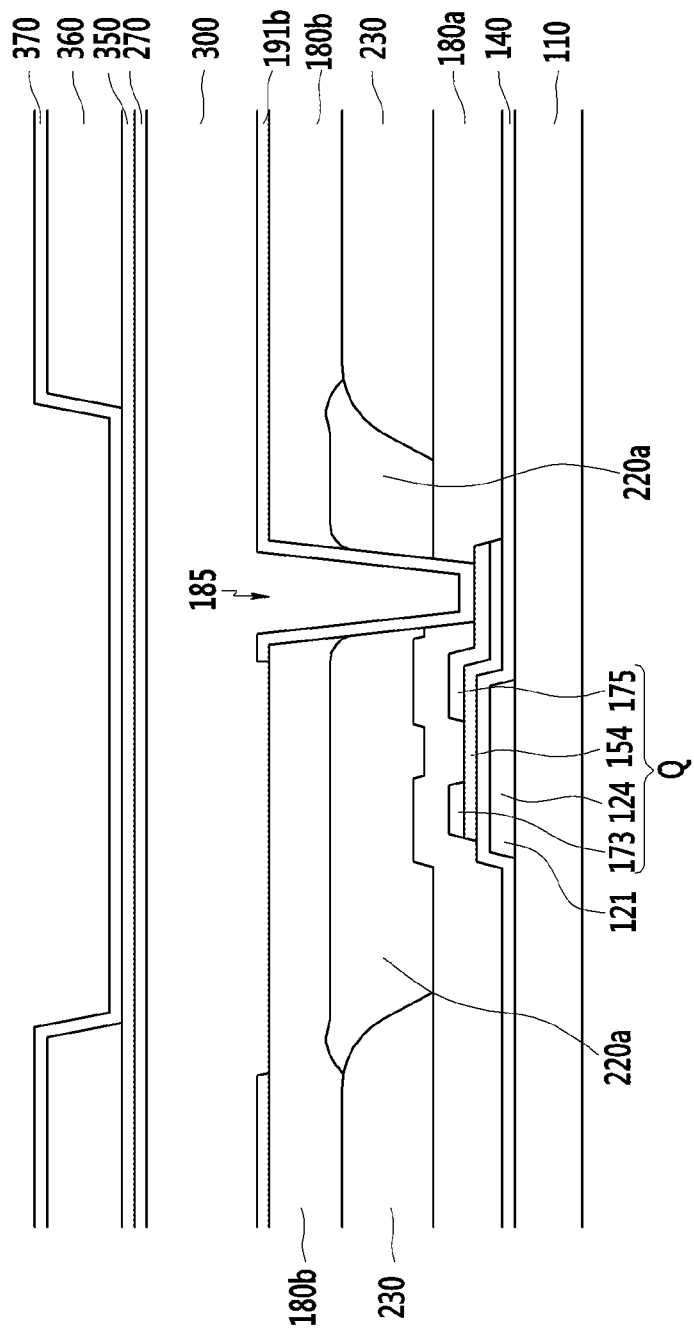
Figure 9:
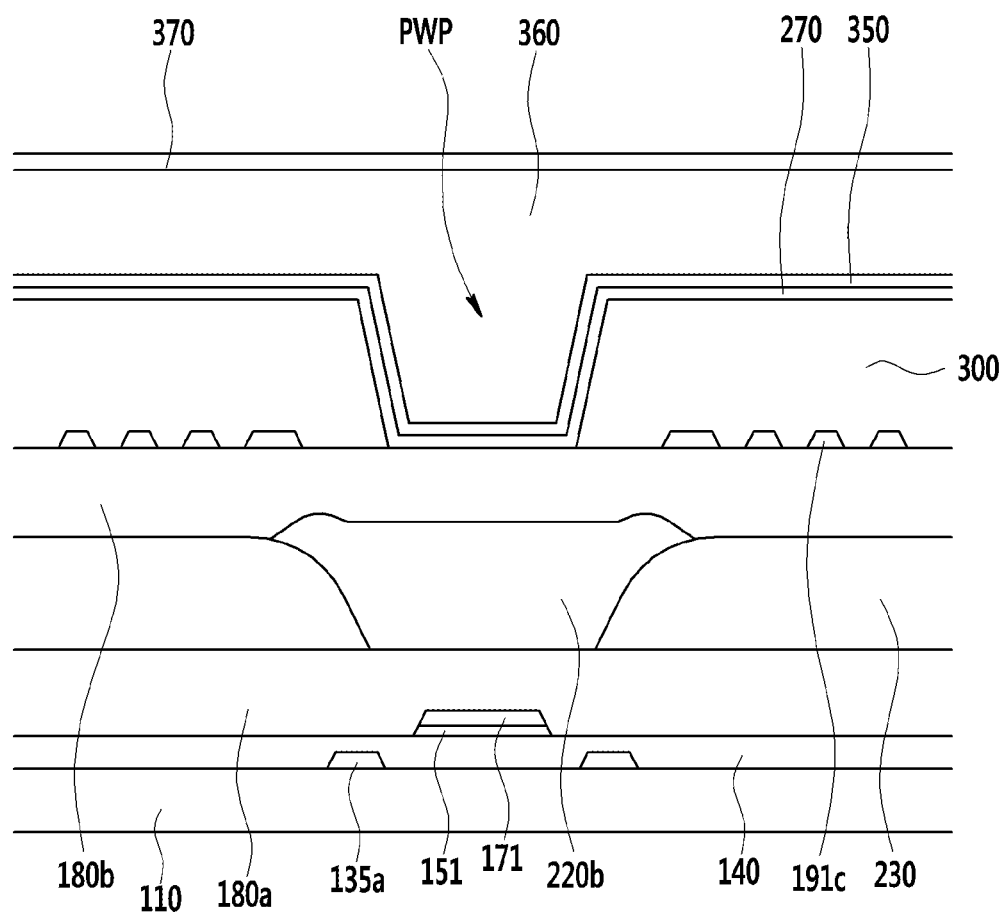

Referring to FIG. 8 and FIG. 9, the upper insulating layer 370 is formed in such a way so as to cover upper portions of the roof layer 360 and the exposed lower insulating layer 350.

Figure 10:
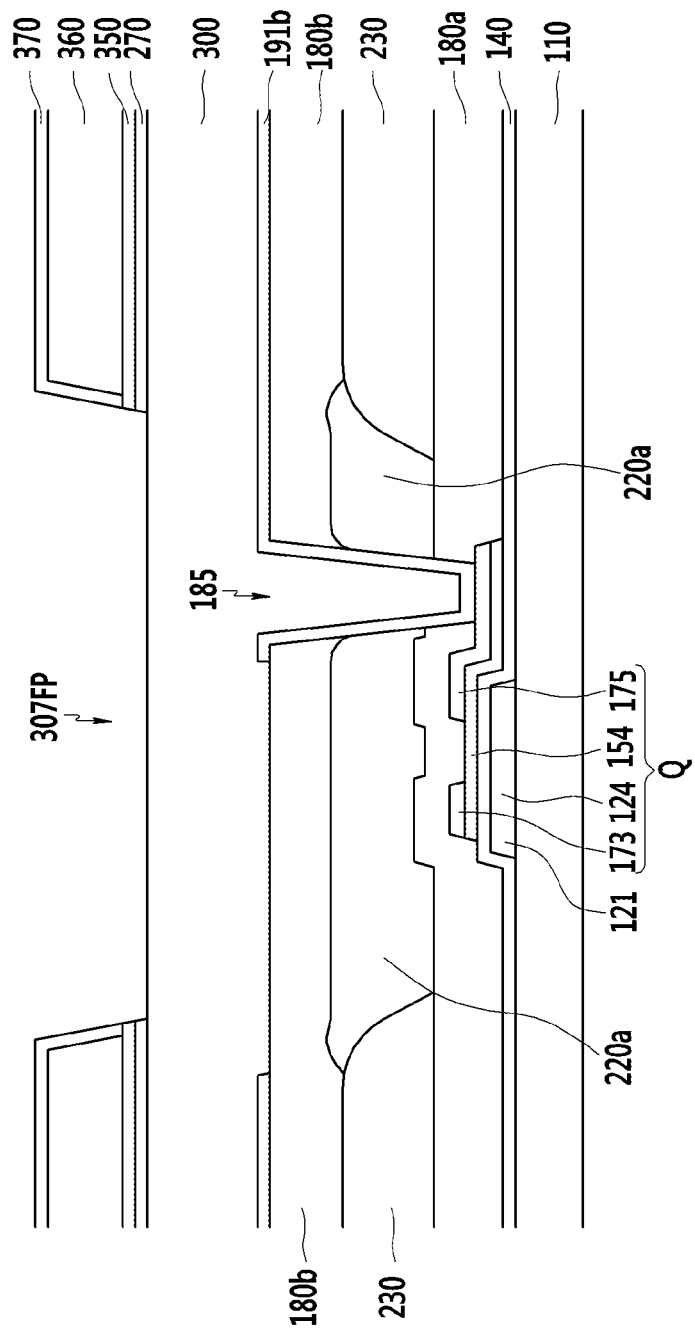

Referring to FIG. 10, the upper insulating layer 370, the lower insulating layer 350, and the common electrode 270 are dry-etched to partially remove the upper insulating layer 370, the lower insulating layer 350, and the common electrode 270, thereby forming the injection hole forming region 307FP. In this case, the upper insulating layer 370 may have a structure that covers a side surface of the roof layer 360, however, is not limited thereto. The upper insulating layer 370 covering the side surface of the roof layer 360 may be removed so that the side surface of the roof layer 360 may be externally exposed.

Figure 11:
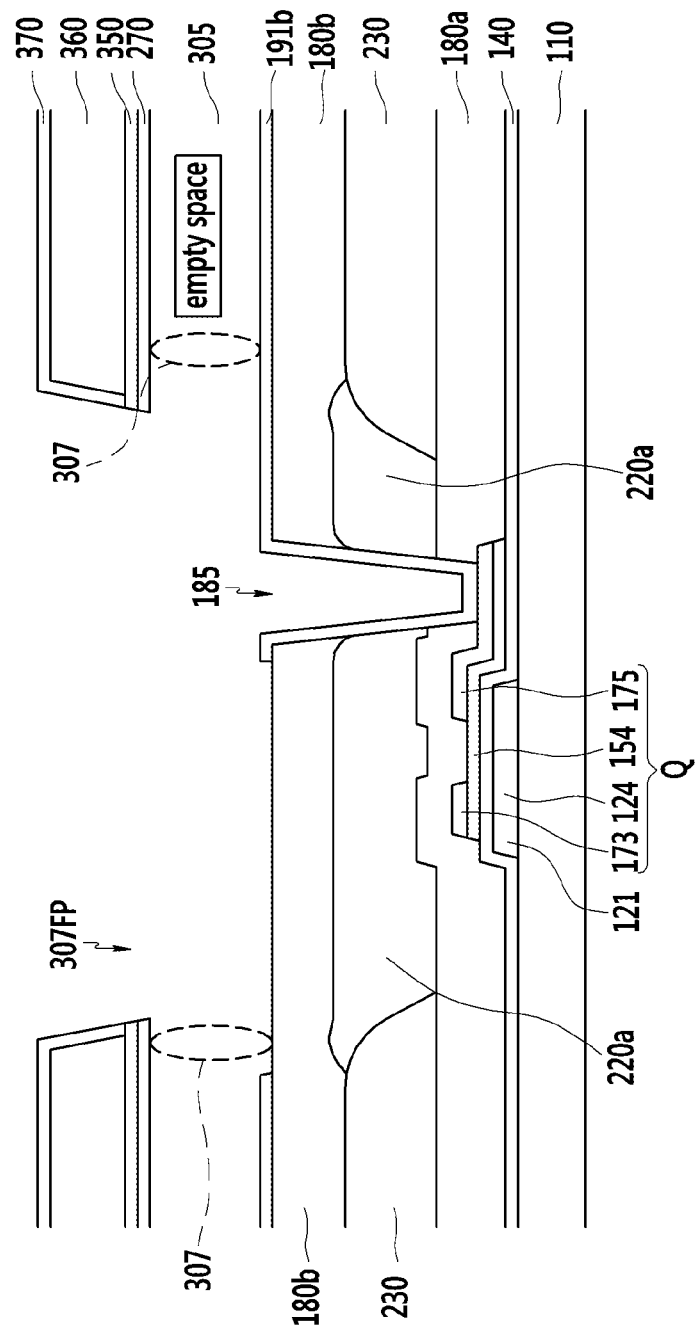
Figure 12:
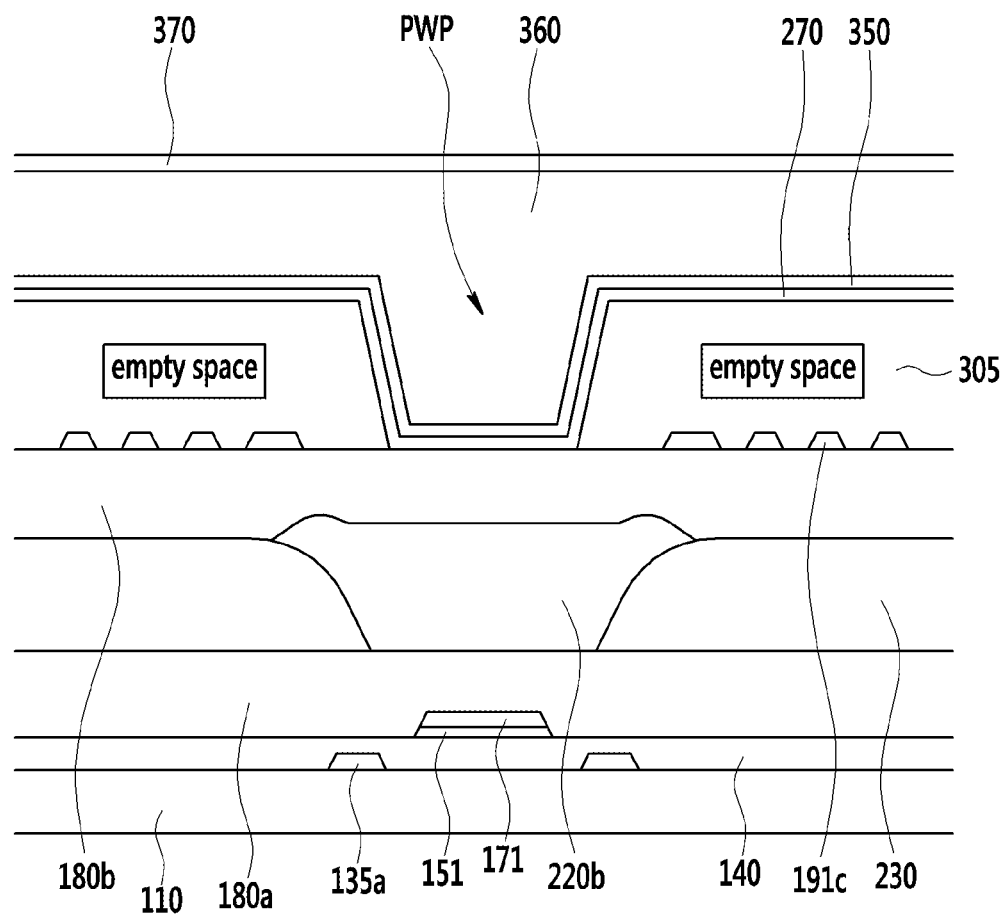

Referring to FIG. 11 and FIG. 12, the sacrificial layer 300 is removed by an oxygen ($O_2$) ashing process or a wet-etching method through the injection hole forming region 307FP. In this case, the microcavities 305 having the injection holes 307 are formed. The microcavities 305 are in a state of an empty space according to the removal of the sacrificial layer 300.

Figure 13:
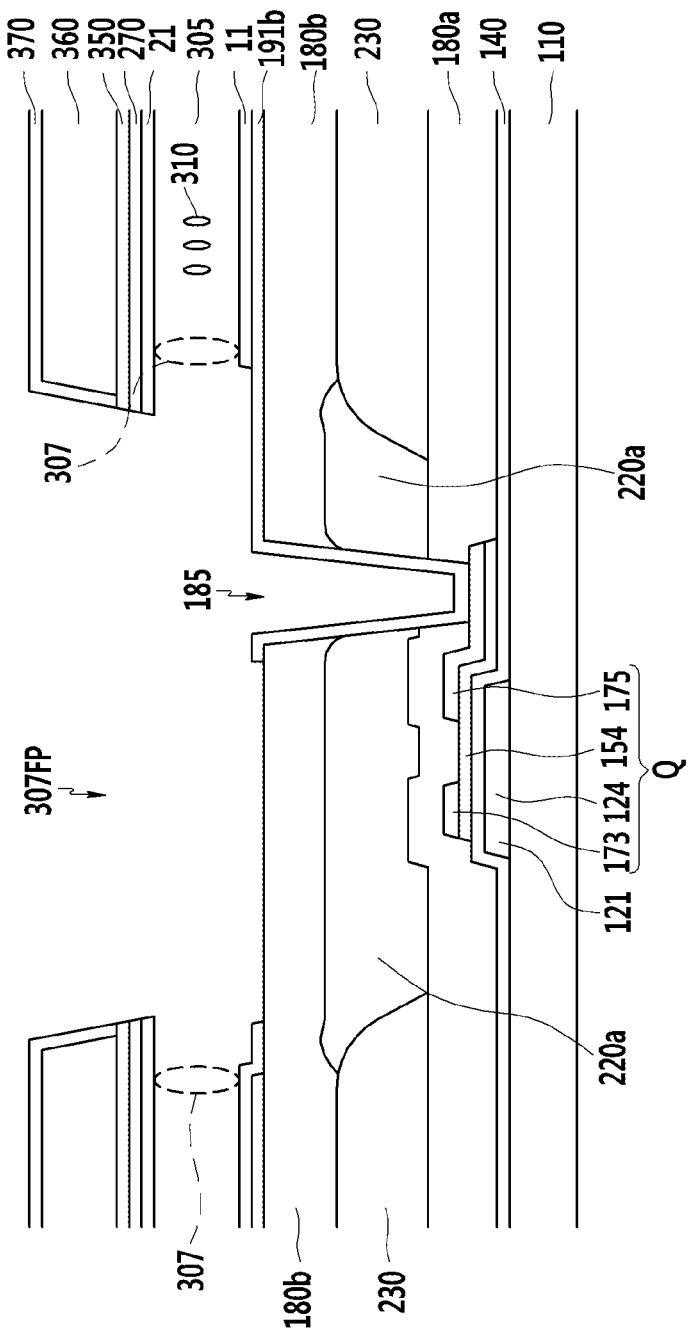
Figure 14:
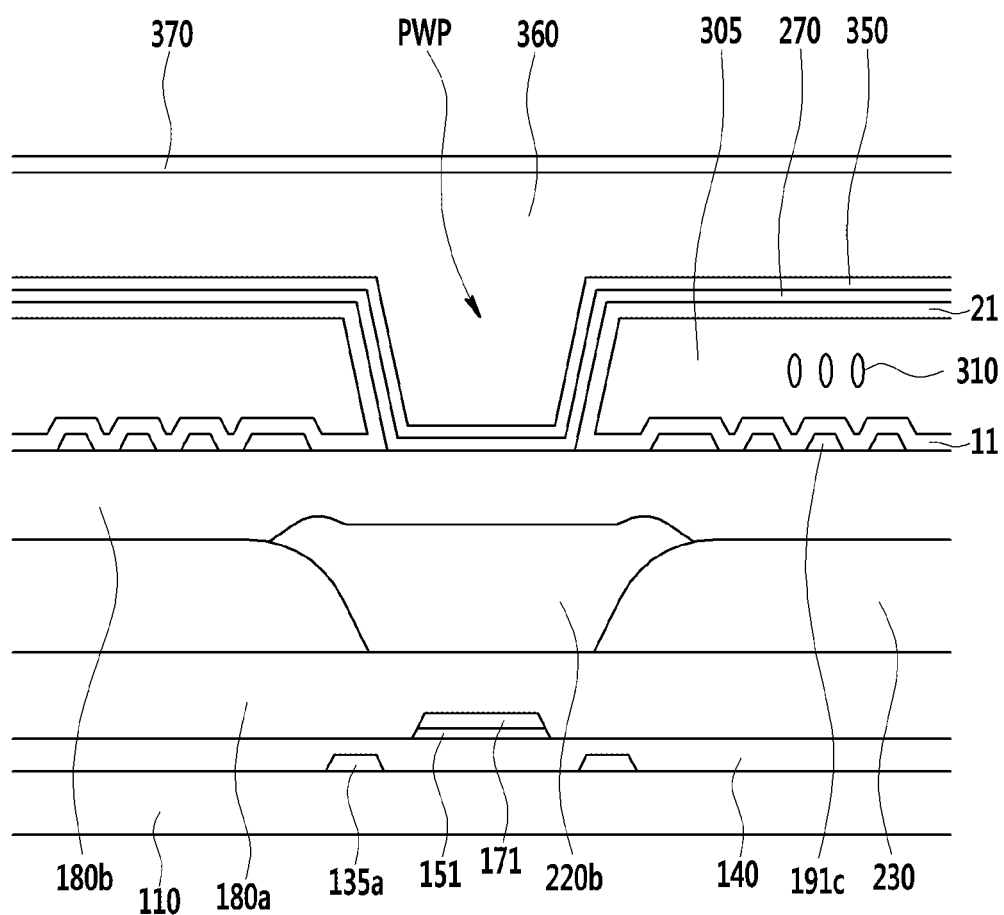

Referring to FIG. 13 and FIG. 14, the alignment layers 11 and 21 are formed on the pixel electrode 191 and the common electrode 270 by injecting an aligning material through the injection holes 307. To that end, a baking process is performed after injecting the aligning material containing a solid content and a solvent through the injection holes 307

Next, the liquid crystal material including the liquid crystal molecules 310 is injected into the microcavities 305 through the injection holes 307 by using an inkjet method and the like.

Figure 15:
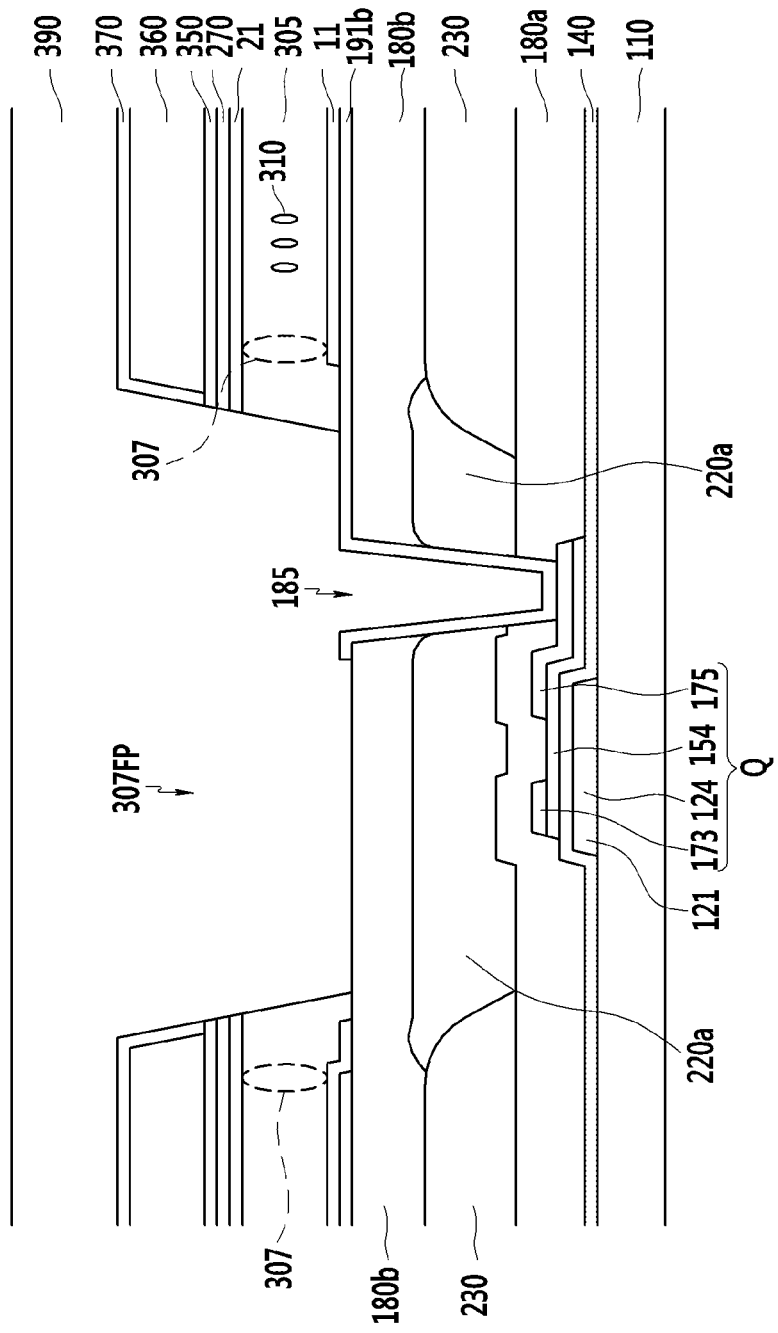

Referring to FIG. 15, the capping layer 390 is formed on the upper insulating layer 370 to cover the liquid crystal injection hole 307. The capping layer 390 may cover the liquid crystal injection hole forming area 307FP. The capping layer 390 may be formed by pushing a capping material from one edge of the substrate 110 to an opposite edge thereof using a bar coater, and then at the same time, curing the capping material using ultraviolet rays.

Figure 16:
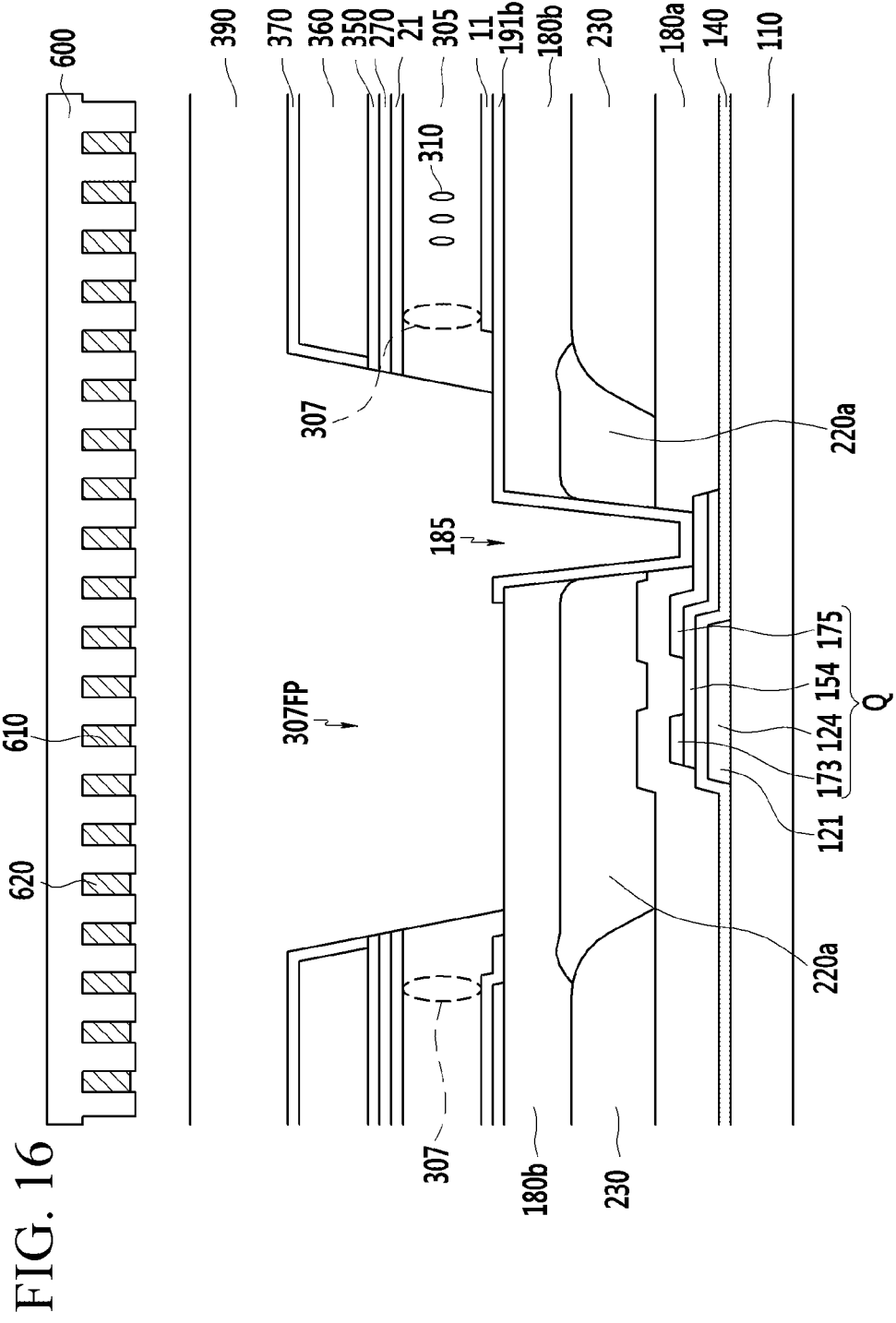

Referring to FIG. 16, a mold 600 having microgrooves 610 is formed on the capping layer 390. Transfer materials 620 are provided between the microgrooves 610 of the mold 600. The transfer materials 620 may be materials obtained by adding silver (Ag) nanoparticles, aluminum nanoparticles, or the like to a resin. Although not shown, a mold in which microgrooves are formed in a direction perpendicular to the extension direction of the microgrooves 610 of the mold 600 disposed on the capping layer may be disposed to correspond to the bottom surface of the substrate 110.

Figure 17:
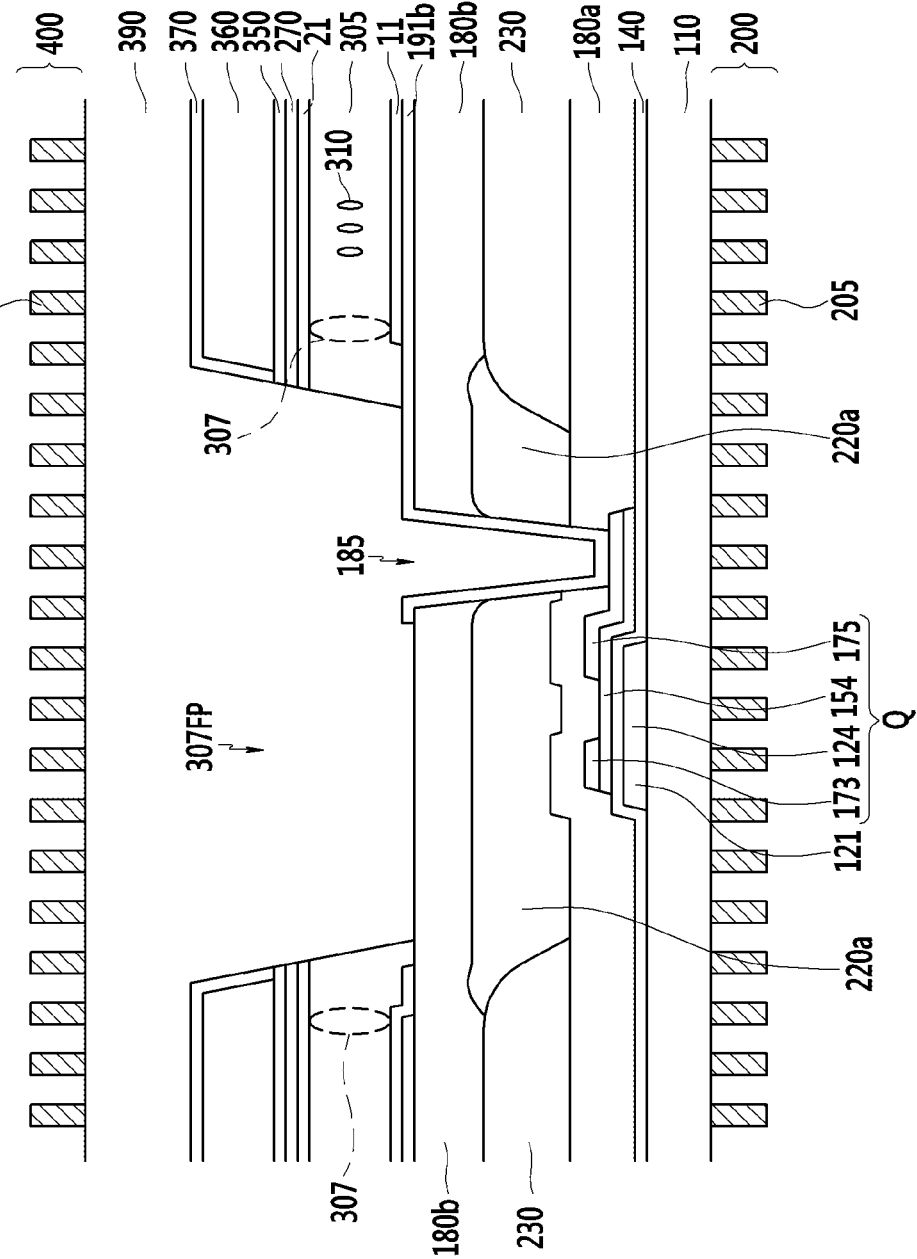
Figure 18A:
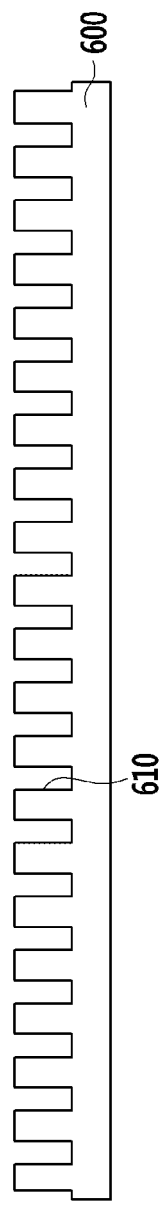
Figure 18B:
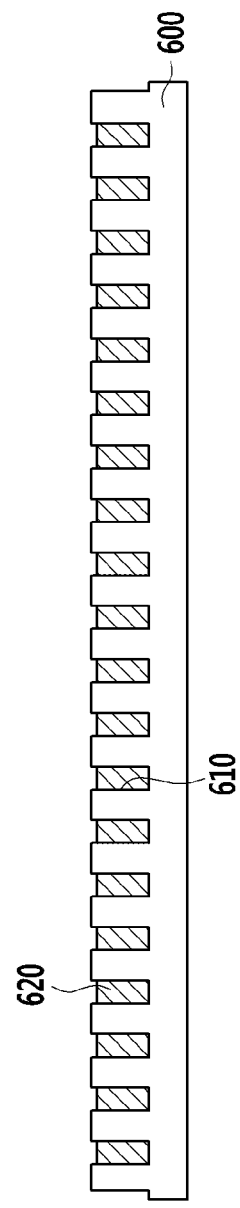
Figure 18C:
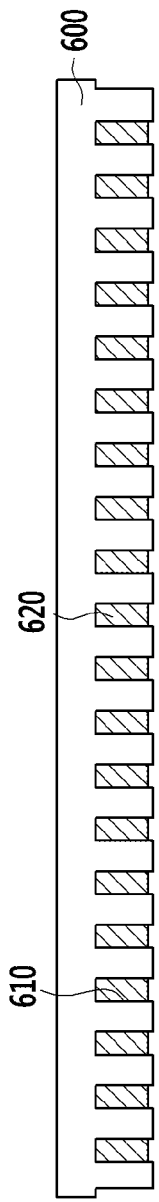
Figure 18D:
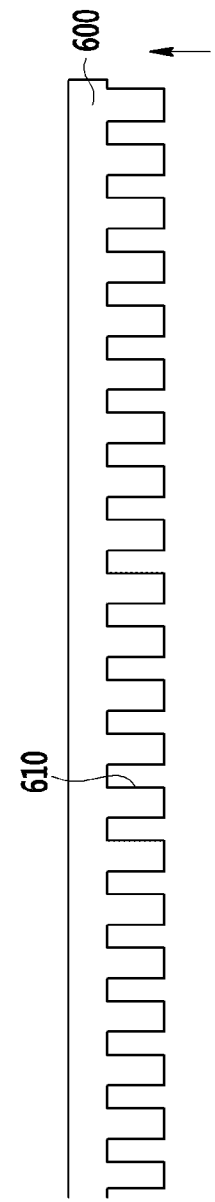

Referring to FIG. 17, the first wire grid polarizer 200 including the first wire grid polarization pattern 205 is formed on the bottom surface of the substrate 110, and the second wire grid polarizer 400 including the second wire grid polarization pattern 405 is formed on the capping layer 390. The first wire grid polarization pattern 205 and the second wire grid polarization pattern 405 may be formed in directions perpendicular to each other.

A method of forming the wire grid polarizers 200 and 400 will be described with reference to FIG. 18.

FIGS. 18A to 18D show stepwise cross-sectional views of the method of forming the first wire grid polarizer 200 or the second wire grid polarizer 400.

Referring to FIGS. 18A to 18D, the mold 600 having microgrooves 610 is prepared. The transfer materials 620 obtained by adding the Ag nanoparticles or the aluminum nanoparticles are formed inside the microgrooves 610. The mold 600 is disposed on the bottom surface of the substrate 110, and heat or light is applied thereto. The transfer materials 620 are transferred and hardened to form the first wire grid polarization pattern 205 on the bottom surface of the substrate 110. In the same way, the second wire grid polarization pattern 405 can be formed on a top surface of the capping layer 390. However, the first wire grid polarization pattern 205 and the second wire grid polarization pattern 405 may be formed in directions perpendicular to each other.

The method of forming the first wire grid polarization pattern 205 and the second wire grid polarization pattern 405 may be performed by using various methods such as a photolithography method, a nano-imprint method, and an electrohydrodynamic (EHD) printing method without the restriction to the printing method shown in FIGS. 18A to 18D.

Thereafter, the passivation layers 210 and 410 can be respectively formed on the first wire grid polarization pattern 205 and the second wire grid polarization pattern 405 to form the liquid crystal display shown in FIG. 2.

Figure 19:
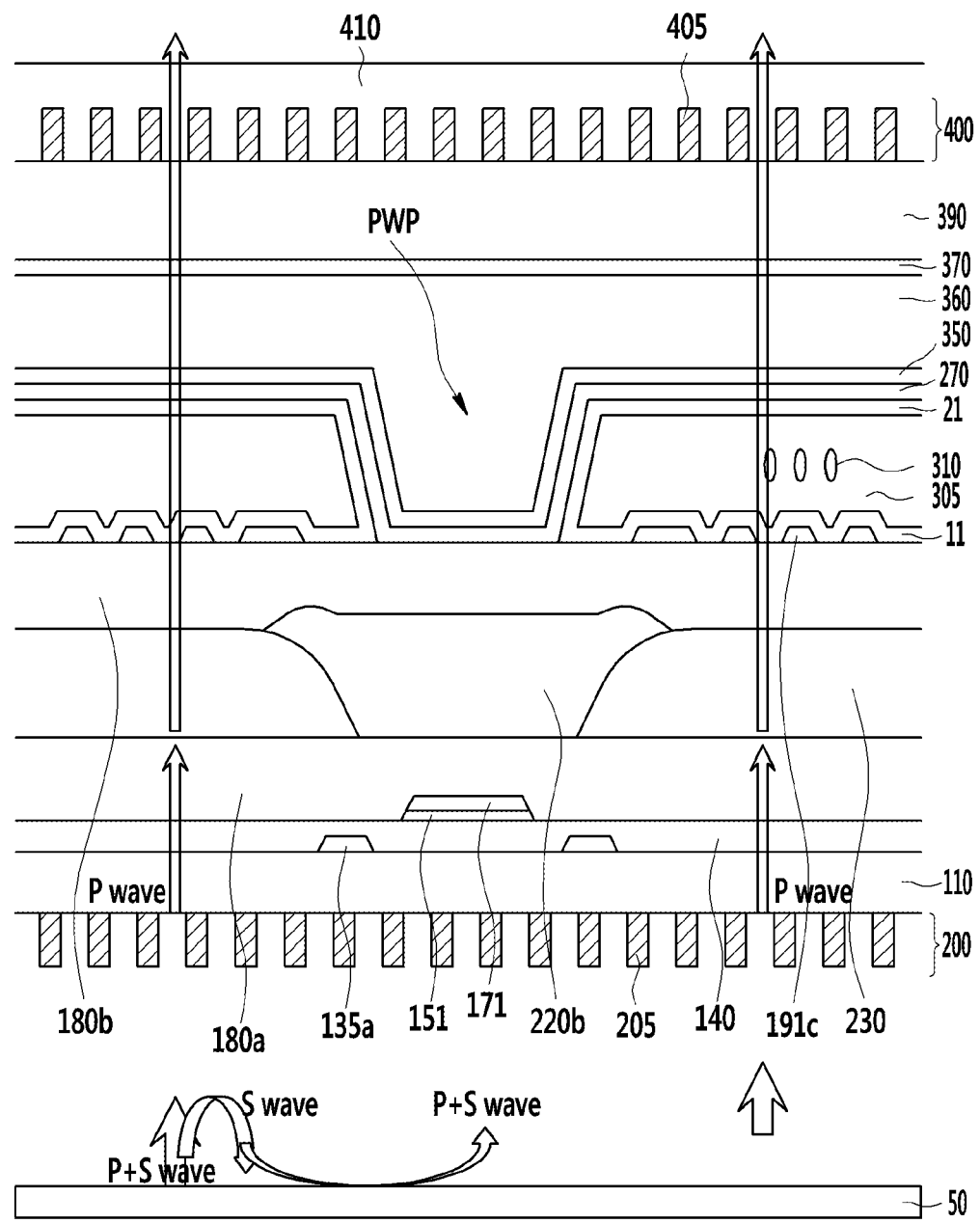
FIG. 19 is a top plan view showing how light passes in the liquid crystal display in accordance with the exemplary embodiment.

FIG. 19 is a top plan view showing how light passes in the liquid crystal display in accordance with the exemplary embodiment.

A backlight device 50 may be disposed to corresponding to the bottom surface of the substrate 110. Light emitted from the backlight device 50 can pass toward the top surface of the substrate 110 through the first wire grid polarizer 200.

The first wire grid polarization pattern 205 of the first wire grid polarizer 200 is made of a high-reflectance material, and thus the light can be reused by increasing light reflection efficiency. For example, the light reflection efficiency can be improved by allowing a P wave of the light to pass therethrough and an S wave thereof to be reflected for reuse.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements <Description of Symbols>

| | |
|---|---|
| 300 sacrificial layer | |
| 310 liquid crystal molecule | 305 microcavity |
| 307 injection hole | 350 lower insulating layer |
| 360 roof layer | 370 upper insulating layer |
| 390 capping layer | |

What is claimed is:

1. A liquid crystal display comprising:
   a substrate having a bottom surface and a top surface;
   a first wire grid polarizer disposed on the bottom surface of the substrate;
   a thin film transistor disposed on the top surface of the substrate;
   a pixel electrode connected to the thin film transistor;
   a roof layer disposed to face the pixel electrode; and
   a plurality of microcavities having injection holes formed between the pixel electrode and the roof layer, the microcavities forming a liquid crystal layer containing liquid crystal molecules.

2. The liquid crystal display of claim 1, further comprising a capping layer disposed on the roof layer,
   wherein the capping layer covers the injection holes.

3. The liquid crystal display of claim 2, further comprising a second wire grid polarizer disposed on the capping layer.

4. The liquid crystal display of claim 3, further comprising a passivation layer covering the second wire grid polarizer.

5. The liquid crystal display of claim 4, wherein the passivation layer fills a groove of the second wire grid polarizer.

6. The liquid crystal display of claim 5, further comprising a common electrode and a lower insulating layer disposed between the microcavities and the roof layer,
   wherein the lower insulating layer is disposed on the common electrode.

7. The liquid crystal display of claim 6, wherein an injection hole formation region is formed between the microcavities, and the capping layer covers the injection hole formation region.

8. The liquid crystal display of claim 7, wherein the thin film transistor is connected to a data line, and a partition wall formation portion is formed between the microcavities along an extension direction of the data line.

9. The liquid crystal display of claim 1, further comprising a backlight unit configured to emit light disposed at a lower end of the first wire grid polarizer,
   wherein the light emitted from the backlight device passes toward the top surface of the substrate through the first wire grid polarizer.

10. The liquid crystal display of claim 1, wherein the substrate is a flexible substrate.

11. A manufacturing method of a liquid crystal display, the method comprising:
    forming a thin film transistor on a top surface of a substrate;
    forming a pixel electrode to be connected to the thin film transistor;
    forming a sacrificial layer on the pixel electrode;
    forming a roof layer on the sacrificial layer;
    forming a plurality of microcavities having injection holes by removing the sacrificial layer;
    injecting a liquid crystal material into the microcavities; and
    forming a first wire grid polarizer on a bottom surface of the substrate.

12. The manufacturing method of claim 11, further comprising
    forming a capping layer on the roof layer,
    wherein the capping layer is formed to cover the injection holes.

13. The manufacturing method of claim 12, further comprising
    forming a second wire grid polarizer on a top surface of the capping layer.

14. The manufacturing method of claim 13, further comprising
    forming a passivation layer on the capping layer to cover the second wire grid polarizer.

15. The manufacturing method of claim 14, further comprising
    forming a common electrode and a lower insulating layer on the sacrificial layer, before the forming of the roof layer.

16. The manufacturing method of claim 15, further comprising
    forming an injection hole formation region between the microcavities,
    wherein the capping layer is formed to cover the injection hole formation region.

17. The manufacturing method of claim 16, wherein the injection hole formation region is formed to extend along a direction parallel with a gate line connected to the thin film transistor.

18. The manufacturing method of claim 17, wherein the thin film transistor is connected to a data line, and a partition wall formation portion is formed between the microcavities along an extension direction of the data line.

19. The manufacturing method of claim 11, wherein the substrate is formed as a flexible substrate.

* * * * *